A. JOHNSTON.

Ruffling Attachment for Sewing-Machines.

No. 5,071. Reissued Sep. 24, 1872.

*Witnesses.*

C. B. Cottingham

A. Moore

*Inventor.*

Allen Johnston by

A. Hollick atty.

UNITED STATES PATENT OFFICE.

ALLEN JOHNSTON, OF OTTUMWA, IOWA, ASSIGNOR TO THE JOHNSTON RUFFLER COMPANY, OF SAME PLACE.

IMPROVEMENT IN RUFFLING ATTACHMENTS FOR SEWING-MACHINES.

Specification forming part of Letters Patent No. 122,611, dated January 9, 1872; reissue No. 5,071, dated September 24, 1872.

*To all whom it may concern:*

Be it known that I, ALLEN JOHNSTON, of Ottumwa, Wapello county, Iowa, have invented certain new and useful Improvements in Gathering and Ruffling Attachments for Sewing-Machines, of which the following is a specification:

My invention relates to that class of gathering and ruffling attachments for sewing-machines in which the goods to be gathered pass above a reciprocating gathering-blade, designed to work against an upper stationary surface, which is held down upon the goods to be gathered with a yielding pressure derived from the presser-bar of the machine, as shown, for instance, in the Letters Patent granted to myself and W. T. Johnston, January 31, 1871. The invention mainly consists in the combination, with the stationary upper blade or plate which prevents the gather from being drawn back when the reciprocating gathering-blade is receding, as described in the Letters Patent to myself and W. T. Johnston, above mentioned, of a foot or presser fixed to the attachment and serving instead of the ordinary sewing-machine presser-foot, and so constructed and arranged that there will be between the stationary blade and the foot a recess or space to contain the gather held by said stationary blade. My invention further consists in the special construction of the foot and its combination with the stationary and reciprocating spring-blades of the attachment, as hereinafter described.

In illustration of the manner in which my invention may be carried into effect I have in the annexed drawing represented its application to an attachment of the kind described and shown in the aforesaid Letters Patent granted to myself and W. T. Johnston.

Figure 1:
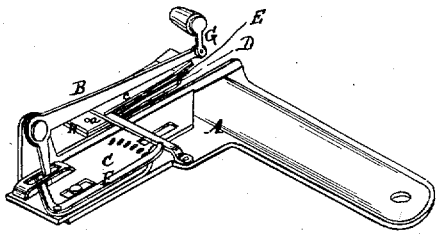
Figure 2:
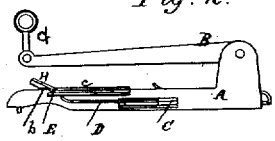
Figure 3:
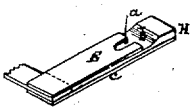

Figure 1 is a perspective view, and Fig. 2 is a side elevation of the attachment. Fig. 3 is an enlarged perspective view from the under side of the stationary blade.

A represents the plate or frame by which all the other parts of the attachment are carried. B is the lever operating the reciprocating plate C with its gathering-blade D. E is the upper stationary blade, and F is the adjusting-lever for regulating the movement of the gatherer. These parts are constructed and operate together substantially as described in the aforesaid Letters Patent, and therefore require no further description here. To the frame A is secured a foot, H, which is so located that it will come under and receive a downward pressure from the presser bar or foot of the sewing-machine to which the attachment may be applied. The foot, thus bearing with a yielding pressure upon the goods between it and the feed-surface below, takes the place and performs the functions of the presser-foot so long as the attachment remains in place on the machine. At the same time it is part and parcel of the attachment, and is permanently fixed in the position in which it is best adapted to operate in connection with the gathering devices.

To facilitate the formation of the gathers and to maintain them in proper condition until they are sewn and secured, a space or recess should be provided between the bearing-surface of the foot—or that portion of its bottom which bears on the feed-surface—and the end of the upper stationary blade, into which space or recess the goods pushed forward by the lower blade, in order to form the gather, will be received and held. This is effected in the present instance by forming a groove or recess, *b*, in the foot, which fully answers the purpose, the gather remaining in the recess, and not being carried forward between the bearing-surface of the foot and the feed-surface of the sewing-machine until it has been sewn down. In the foot, when arranged as shown, I also form a hole, *a*, for the passage of the needle.

In an attachment provided with spring-blades of the special construction represented, it is necessary that the two blades D E, which are of spring-metal, should, at their free ends, bear against one another with a yielding pressure. To this end I fix the foot H on a spring strip or plate, *c*, which is made fast at one end to the frame A, and extends along over and in close proximity to the upper blade E, and the foot H is so formed and arranged, as indicated in Fig. 2, that, when pressed downward by the presser-bar of the machine, it will bear upon and press down the blade E, without, however, closing the recess *b*, which still remains to receive the gather. The outer end or longer arm of the lever B is provided with a link or pitman, G, with an eye in its free end to fit over the needle-screw on the needle-bar. This arrangement is in lieu of the usual slot or loop in the outer end of the lever B, as the latter arrangement has, in some instances, been found inconvenient and not adapted to secure the best results.

Having described my invention and the manner in which the same is or may be carried into effect, what I claim, and desire to secure by Letters Patent, is—

1. The combination, in a gathering and ruffling attachment, of an under reciprocating gathering-blade, an upper stationary blade, and a foot or presser, operating together substantially as shown and described, the latter two being so constructed and arranged that there will be, between the end of the stationary blade and the bearing-surface of the foot or presser, a recess or space to contain the gather held by said blade during the receding of the gathering-blade, substantially as set forth.

2. The foot H, provided with needle-hole *a* and groove *b* on the under side, and arranged and operating with the stationary upper spring E and lower reciprocating gathering-spring D, substantially as and for the purposes herein set forth.

In testimony whereof I have signed my name to this specification before two subscribing witnesses.

ALLEN JOHNSTON.

Witnesses:
J. S. PAINTER,
THOMAS K. SHEPHERD.